United States Patent [19]
Sedy

[11] Patent Number: 5,560,622
[45] Date of Patent: Oct. 1, 1996

[54] SECONDARY SEAL FOR NON-CONTACTING FACE SEAL ASSEMBLY

[75] Inventor: Josef Sedy, Mount Prospect, Ill.

[73] Assignee: Durametallic Corporation, Kalamazoo, Mich.

[21] Appl. No.: 348,444

[22] Filed: Dec. 2, 1994

Related U.S. Application Data

[63] Continuation-in-part of Ser. No. 991,315, Dec. 16, 1992, Pat. No. 5,370,403.

[51] Int. Cl.⁶ ........................................ F16J 15/38
[52] U.S. Cl. ............................ 277/85; 277/157; 277/163
[58] Field of Search ..................... 277/38, 39, 40, 277/81 R, 85, 86, 87, 92, 157, 163, 164

[56] References Cited

U.S. PATENT DOCUMENTS

| | | | |
|---|---|---|---|
| 3,245,692 | 4/1966 | Voitik | 277/40 |
| 3,592,479 | 7/1971 | Andresen | 277/87 |
| 4,655,462 | 4/1987 | Balsells | 277/164 |
| 4,768,790 | 9/1988 | Netzel et al. | 277/93 SD |
| 5,058,905 | 10/1991 | Nosowicz et al. | 277/81 R |
| 5,172,918 | 12/1992 | Pecht et al. | 277/85 |
| 5,174,584 | 12/1992 | Lahrman | 277/85 |
| 5,217,233 | 6/1993 | Pecht et al. | 277/93 SD |
| 5,370,403 | 12/1994 | Sedy | 277/85 |
| 5,375,855 | 12/1994 | Goldswain et al. | 277/81 R |
| 5,388,843 | 2/1995 | Sedy | 277/81 R |

Primary Examiner—William A. Cuchlinski, Jr.
Assistant Examiner—John L. Beres
Attorney, Agent, or Firm—Flynn, Thiel, Boutell & Tanis, P.C.

[57] ABSTRACT

A non-contacting face seal assembly for a shaft rotating at high speed with an improved secondary seal for low axial drag force. The secondary seal comprises an O-ring with a compliant spring element at its outer circumference. The compliant spring provides a controlled radial force, which keeps the secondary seal in a more reliable sealing contact with the seal ring and the seal housing surface but avoids excessive radial forces so that low axial drag forces due to secondary seal displacements are generated to prevent sealing face hang-up.

7 Claims, 4 Drawing Sheets

SECONDARY SEAL FOR NON-CONTACTING FACE SEAL ASSEMBLY

CROSS REFERENCE TO RELATED APPLICATION

This Application is a continuation-in-part of application Ser. No. 07/991 315, filed Dec. 6, 1992, now U.S. Pat. No. 5,370,403.

FIELD OF THE INVENTION

This invention relates to sealing devices for rotating shafts where fluid is employed to generate pressure forces between interacting face-type sealing elements, where one is stationary and the other rotating. These forces provide for slight separation and non-contacting operation of the above sealing elements, thereby minimizing face wear and friction losses while maintaining low fluid leakage. More specifically, this invention relates to an improved secondary seal for cooperation with one of the sealing elements of the sealing device.

BACKGROUND OF THE INVENTION

Non-contacting face seal assemblies are usually applied to high-speed, high-pressure rotating equipment where the use of ordinary mechanical face seal assemblies with face contact would result in excessive generation of heat and wear. Non-contacting operation avoids this undesirable face contact when the shaft is rotating above a certain minimum speed, which is often called a lift-off speed.

As with ordinary contacting-type mechanical seal assemblies, a non-contacting face seal assembly consists of two sealing rings, each of which is provided with a very precisely finished sealing surface or face. These surfaces are perpendicular to and concentric with the axis of rotation. Both rings are positioned adjacent to each other with the sealing surfaces in contact at conditions of zero pressure differential and zero speed of rotation. One of the rings is normally fixed to the rotatable shaft, and the other is located within the seal housing structure and allowed to move axially. To enable axial movement of this sealing ring and yet prevent leakage of the sealed fluid, a sealing element is placed between this ring and the housing. This sealing element must permit some sliding motion while under pressure, and therefore a top quality O-ring is normally selected for that duty. This O-ring is often called the secondary seal.

To achieve non-contacting operation of the seal assembly, one of the two sealing surfaces in contact is usually provided with shallow surface recesses, which act to generate pressure fields that force the two sealing surfaces apart. When the magnitude of the forces resulting from these pressure fields is large enough to overcome the forces that urge the seal faces closed, the sealing surfaces will separate and form a clearance, resulting in non-contacting operation. The character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, during the operation of the seal or on imposition of sufficient pressure differential equilibrium separation between both surfaces will establish itself. This occurs when closing and opening forces are in equilibrium and equal to each other. Equilibrium separation constantly changes within the range of gaps. The goal is to have the low limit of this range above zero. Another goal is to make this range as narrow as possible, because on its high end the separation between the faces will lead to increased seal leakage. Since non-contacting seals operate by definition with a clearance between sealing surfaces, their leakage will be higher than that of a contacting seal of similar geometry. Yet, the absence of contact will mean zero wear on the sealing surfaces and therefore a relatively low amount of heat generated between them. It is this low generated heat and lack of wear that enables the application of non-contacting seal assemblies (commonly referred to as dry gas seals) to high-speed turbomachinery, where the sealed fluid is gas. Turbocompressors are used to compress this fluid and since gas has a relatively low mass, they normally operate at very high speeds and with a number of compression stages in series.

During a typical period of operation, a turbocompressor is started and the power unit starts the shaft rotating. At the initial warm-up stage of operation, shaft speeds may be quite low. Typically, oil is used to support the shaft at its two radial bearings and one thrust bearing. Oil warms up in oil pumps and also accepts shear heat from compressor bearings. The oil together with process fluid turbulence and compression in turn warm-up the compressor. Once the full operating speed is reached, the compressor reaches in time some elevated equilibrium temperature. On shutdown, shaft rotation stops and the compressor begins to cool down. In this situation, various components of the compressor cool down at different rates and, importantly, the shaft contracts with decreasing temperature at a different rate than the compressor casing. The net result of this at the seal assembly is the axial creeping motion of the shaft and the seal parts fixed to it, which may move the rotatable sealing face away from the stationary sealing face. With often only a spring load behind the stationary sealing ring, the stationary sealing face may not be able to follow the retracting rotating face, if the above-mentioned secondary seal has too much friction. These prior art secondary seal arrangements can be found for example in U.S. Pat. Nos. 4,768,790; 5,058,905 or 5,071,141. The term used often in the industry for this phenomenon is "seal face hang-up". In such case there may be a very high leakage of process fluid the next time the compressor is restarted and often in such cases the seal assembly will resist all attempts to reseal it. The seal assembly must then be removed and replaced at a considerable cost in time and lost production.

This invention is aimed at the reduction of friction forces at the secondary seal of a non-contacting face seal assembly to prevent its excessive drag and the corresponding hang-up of the axially movable seal face which causes high process fluid leakage. These friction forces cannot be lowered beyond a certain value with prior art arrangements, where typically an O-ring or a similar elastomer seal would be placed between two concentric cylindrical surfaces. While these surfaces can be machined with a high degree of accuracy to provide for uniform radial clearance to accept the secondary seal, the elastomer-type secondary seal itself is typically quite non-uniform in its cross-section. To eliminate the possibility of leakage, it is then necessary to design the radial clearance for this secondary seal narrower than what is the cross-sectional dimension of the secondary seal at its thinnest point. Given the relatively high non-uniformity of O-ring or similar seal cross-sections, this results in considerable squeeze in areas where the secondary seal is thicker, and therefore results in considerable friction and drag which can cause hang-up.

Another aim of the invention is to assure a reliable sealing contact despite secondary seal cross-section non-uniformities.

The improvement this invention provides is a compliant spring element cooperating with the O-ring or similar secondary seal. The prior art requirement to squeeze the secondary seal into a uniform radial gap with the consequence of high friction forces is thus eliminated. Circumferential compliance of the spring enables the spring to place a considerably lower and more uniform load onto the secondary seal, a load which is relatively independent of variations in the secondary seal cross-section. This results in dramatically lower friction and drag forces and therefore a lesser danger of the seal face hang-up, resulting in a more reliable sealing action.

Other objects and purposes of the invention will be apparent from the detailed description of the invention as presented below.

Figure 1:
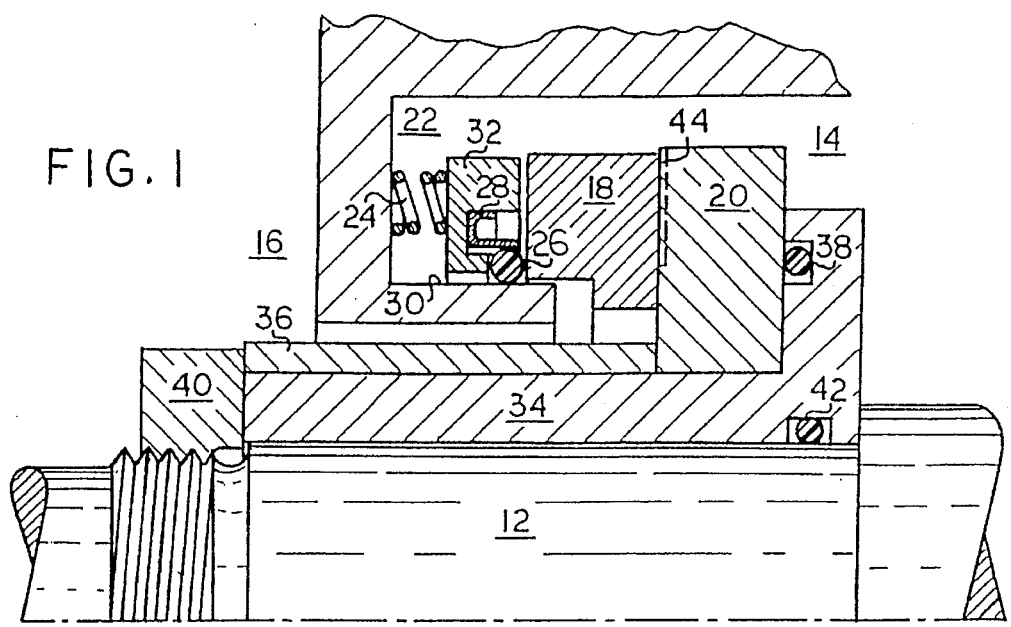
FIG. 1 is a cross-sectional view of a non-contacting seal assembly, constructed in accordance with this invention, taken along the longitudinal axis thereof.

In the following description, certain terminology will be used for convenience in reference with respect to the present invention, but will not be limiting. For example, the words "upwardly", "downwardly" "rightwardly", and "leftwardly" will refer to directions in the drawings to which reference is made. The words "inwardly" and "outwardly" will refer to directions toward and away from, respectively, the geometric center of the seal assembly or designated parts thereof. Said terminology will include the words specifically mentioned, derivatives thereof, and words of similar import.

DETAILED DESCRIPTION

Referring first to FIG. 1, there is shown the invention and its environment. This environment comprises a housing 10 and a rotatable shaft 12, extending through said housing. The invention is applied to seal a fluid within an annular space 14 and to restrict its escape into the fluid environment at 16. The basic components of the invention comprise an annular, axially movable sealing ring 18 in a sealing relationship with an annular rotatable sealing ring 20. The sealing ring 18 is located within a cavity 22 of the housing 10 and held substantially concentric to the rotatable sealing ring 20. Between the housing 10 and the sealing ring 18 is a plurality of springs 24, spaced equidistantly around the cavity 22 of the housing 10. Springs 24 urge the sealing ring 18 into an engagement with the sealing ring 20. An O-ring 26 (i.e. a secondary seal) seals the space between the sealing ring 18 and the housing 10. The compliant spring 28 holds the O-ring 26 in contact with a radially outer cylindrical surface 30 of the housing 10. Compliant spring 28 is held within a disc 32, which acts also as a spacer, through which springs 24 transfer an axial force through the O-ring 26 to the sealing ring 18. While a C-shaped spring of unequal legs is shown, other arrangements with different spring shapes and forms may also be effective. The sealing ring 20 is retained in an axial position against a radial extension of the shaft sleeve 34 by a spacer sleeve 36. An O-ring seal 38 precludes leakage between the sealing ring 20 and the shaft sleeve 34. The shaft sleeve 34 is located axially against a step on the shaft 12 by a locknut 40, which is threaded on the shaft 12 as shown. An O-ring seal 42 precludes leakage between the shaft sleeve 34 and the shaft 12. In operation, the radially extending faces of the sealing ring 20 and the sealing ring 18 are in a sealing relationship, maintaining a very narrow clearance, generated by a shallow and concentric hydrodynamic groove pattern 44. The groove pattern has in many cases a shape of a spiral. Pattern 44 can be electro-plated, etched or otherwise fabricated into the sealing ring 20 or alternatively into the sealing ring 18. Said narrow clearance prevents generation of friction heat and wear, yet limits the outflow of the seal fluid, present at space 14.

Figure 2:
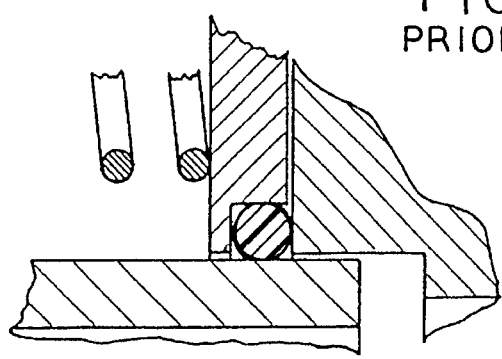
FIG. 2 is an enlarged fragmentary cross-sectional view of a secondary seal arrangement according to the prior art.

FIG. 2 shows an enlarged view of the secondary seal which is typical of the prior art. It can be readily observed that there is no significant elasticity within the structure shown other than that of the O-ring itself. Such an O-ring therefore has to be squeezed radially to a dimension smaller than its narrowest cross-section, shown on the picture by flattened areas of the O-ring circumference on its top and bottom This results in excessive squeeze where the O-ring is thicker, and therefore results in higher drag forces which resist axial displacement and therefore may cause hang-up in that the secondary seal ring and the non-rotatable seal face may be prevented from moving axially and hence the stationary seal face will be unable to maintain the desired positional relationship relative to the rotatable seal face.

Figure 3:
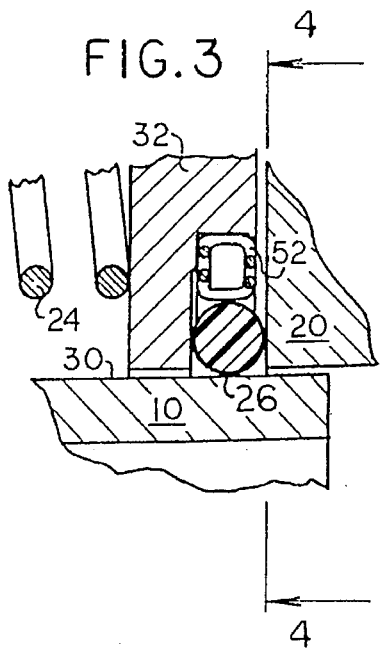
FIG. 3 is an enlarged fragmentary cross-sectional view showing a secondary seal according to another embodiment of the invention.
Figure 4:
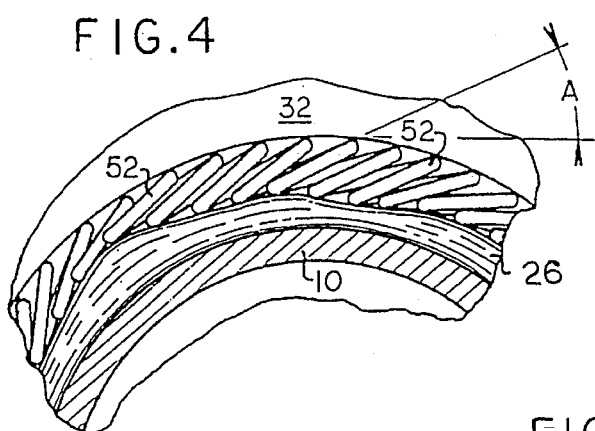
FIG. 4 is an axial view, partially broken away, of the secondary seal taken in a plane indicated by line 4—4 of FIG. 3.
Figure 5:
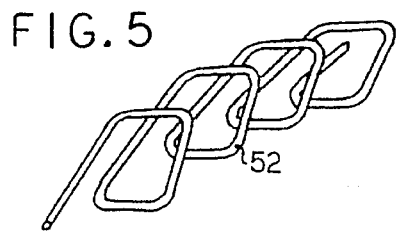
FIG. 5 is a fragmentary perspective view of the compliant spring shown in FIGS. 3 and 4.

FIG. 3 shows an enlarged view similar to FIG. 2 of another embodiment of the invention, where the compliant spring 52 has a form of a slanted wire spring as shown in FIGS. 4 and 5.

FIG. 4 shows an axial view of the slanted coil wire spring 52, taken along line 4—4 of FIG. 3. Slanted coils for this view give the spring the radial elasticity needed for the purpose of imposition of the compliant load on the secondary seal 26.

FIG. 5 shows the compliant wire spring 52 in the perspective view. The wire coils shown are nearly rectangular with rounded corners, but the coils could be also round or oval. The main factor is the angle A that coils assume to the longitudinal axis of the spring. With regular coil springs, this angle would be close to 90°, while here the angle A is less than about 60°, so that spring 52 would be squeezed radially between the disc 32 and the secondary seal 26 as shown at FIG. 4 for local compliance to cross-sectional changes of the secondary seal 26.

Figure 6:
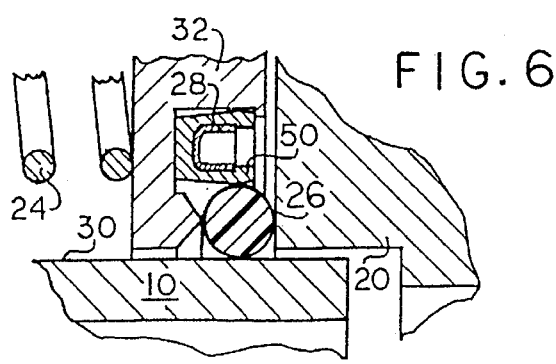
FIG. 6 is a view similar to FIG. 3 but showing yet another embodiment of the invention.

FIG. 6 shows another embodiment of the invention wherein the compliant spring 28 is embedded within a PTFE shield 50. The spring-energized PTFE element of this design is commercially available and would cooperate with an O-ring 26 as shown.

Figure 7:
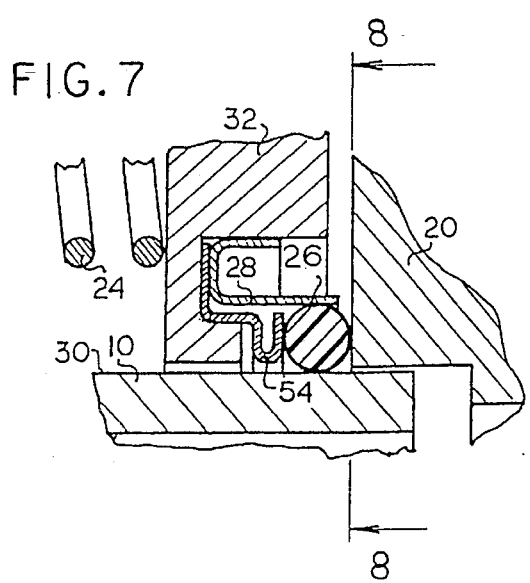
FIG. 7 is an enlarged fragmentary cross-sectional view similar to FIG. 3 and showing another embodiment of the invention.

FIG. 7 is an enlargement of the secondary seal per FIG. 1 with an additional spring element 54 for more compliance in the axial direction.

Figure 9:
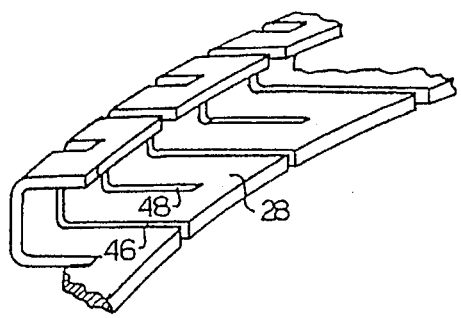
FIG. 9 is a fragmentary perspective view of the compliant spring shown in FIGS. 1, 7 and 8.
Figure 8:
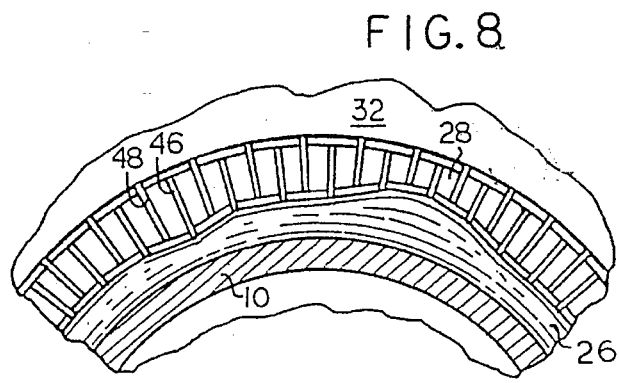
FIG. 8 is an axial view, partially broken away, of the secondary seal taken in a plane indicated by line 8—8 of FIG. 7.

FIG. 8 shows in an exaggerated fashion the local distortions of the compliant spring 28 due to the non-uniformity of the cross-section of the secondary O-ring seal 26. The spring shown is one from flat stock and is shown in FIGS. 1, 7 and 9. Alternating slots 46 and 48 provide for local and circumferential flexibility.

FIG. 9 shows the compliant spring 28 of FIGS. 1, 7 and 8 in a perspective view. There are two kinds of slots made through the compliant spring 28. Slots 46 run completely through the inner longer leg of the compliant spring 28 and slots 48 run completely through the outer shorter leg of the compliant spring 28. Slots 46 and 48 are spaced alternately and evenly around the circumference of the compliant spring 28 to give it circumferential flexibility and an ability to comply locally with the secondary seal cross-section non-uniformities as shown in FIG. 8. The spring shown has straight legs of uneven length, but this is not critical for the proper function of the spring. Other similarly effective flat stock springs can be designed with even legs, curved legs, slots of varying geometries, and even springs of cross-sections other than those in the shape of the letter C.

The above-described method of secondary seal loading eliminates the need to place the secondary seal into the radial, circumferentially uniform gap of the prior art (FIG. 2) with the resulting excessive sliding friction. The same method can be applied also in the axial direction to deal with the axial secondary seal thickness non-uniformities, which are just as large as those in the radial direction. This would now be easier, because radial spring loading of this invention already minimizes axial non-uniformities. The prior art method of squeezing the secondary seal into a uniform radial gap caused the most squeeze in places of largest secondary seal thickness and this in turn caused widening of the secondary seal in the axial direction, largest in the very same places where the seal is already too thick. One can appreciate how this effect magnifies the cross-section non-uniformities in the axial direction. This is not the case with the spring method to this invention. Yet, should the ultimate compliance in the axial direction be desired, it is possible to increase axial penetration of the disc 32 into the secondary seal 26 by providing an edge contact as shown in FIG. 6. This way less axial force will be required for the same depth of penetration and elimination of non-uniformities will therefore require lesser axial force. Another way of increasing axial compliance is the above-mentioned use of a spring in the axial direction, such as the formed spring 54 of FIG. 7, with alternating slots like those of the spring 28 shown in FIG. 9.

Figure 10:
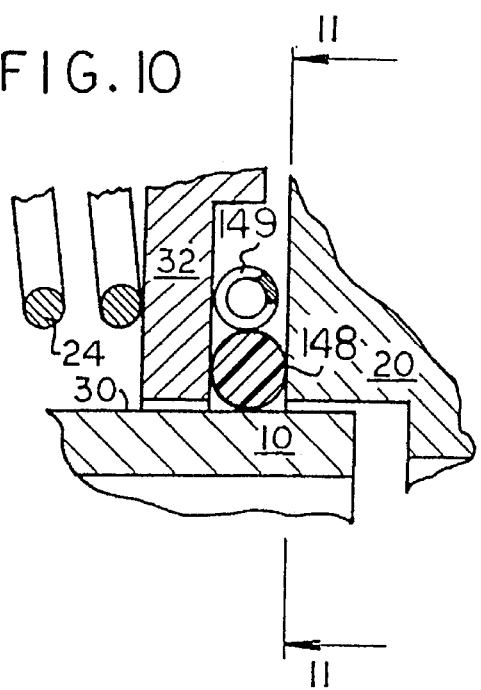
FIG. 10 is an enlarged fragmentary cross-sectional view of a further embodiment of the secondary seal of the invention,.
Figure 11:
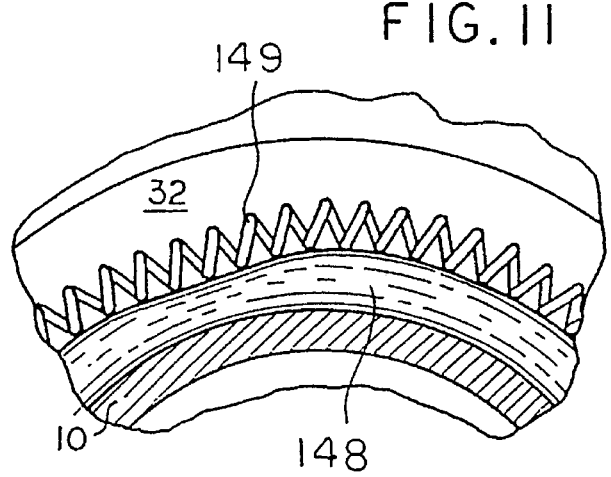
FIG. 11 is an axial view, partially broken away, of the secondary seal taken in a plane indicated by line 11—11 of FIG. 10.

FIG. 10 shows a preferred embodiment of the invention wherein an ordinary tension coil spring is stretched around the secondary seal ring and imposes inward pressure onto the secondary seal ring, pressing it into contact with the outer cylindrical surface of the seal housing with a known force. As shown in FIG. 11, the force acting through the wires of the coil spring on the secondary seal ring is relatively independent of seal ring cross-section non-uniformities, such as the narrowing of the cross-section as shown.

Figure 12:
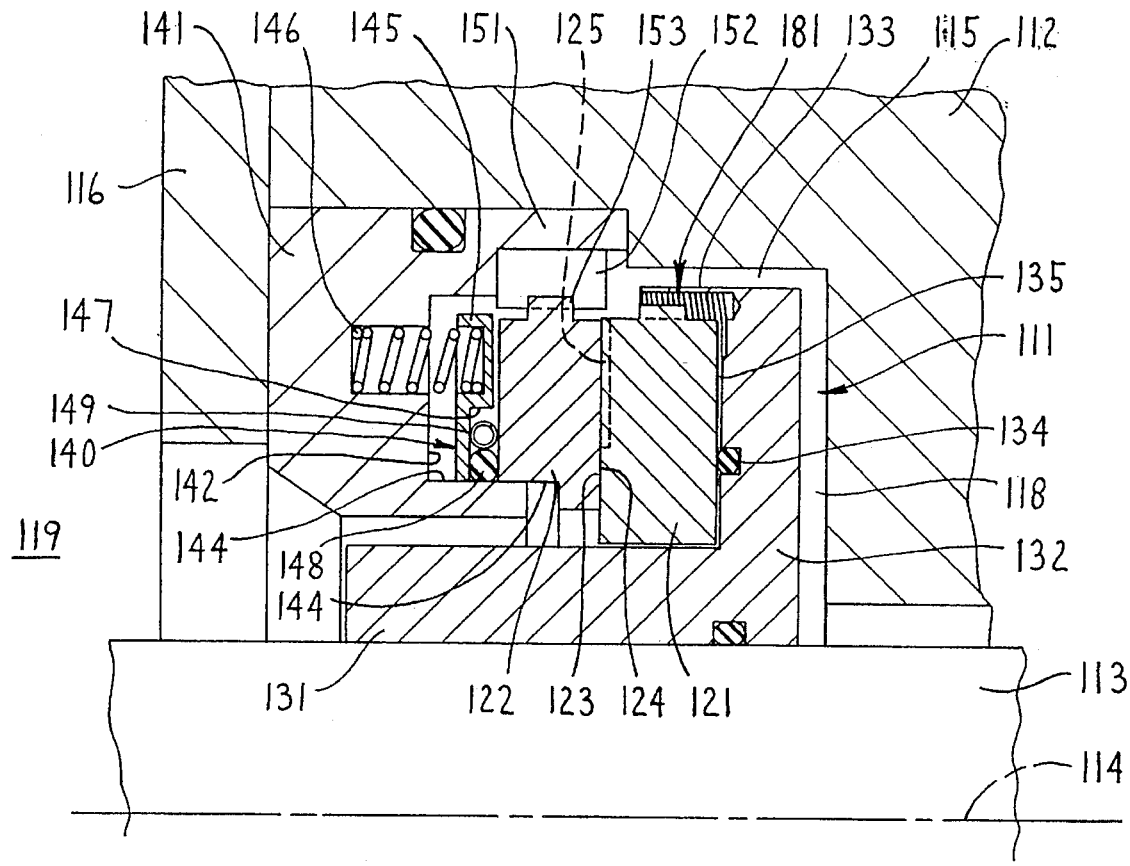
FIG. 12 is a fragmentary axial sectional view illustrating a non-contacting mechanical seal, specifically a dry gas seal, according to the present invention and incorporating therein the improved secondary seal according to the embodiment of FIGS. 10 and 11.

FIG. 12 illustrates therein a mechanical seal assembly 111 disposed for cooperation between a housing 112 and a shaft 113 which is supported for rotation on the housing about its axis 114. The seal assembly 111 includes therein a secondary seal arrangement 140 according to FIGS. 10 and 11 as briefly described above.

More specifically, the seal assembly 111 is disposed in surrounding relationship to the shaft 113 within a chamber 115 defined within the housing, with the seal assembly being retained within the chamber by an end plate or gland member 116 which is fixedly secured to the housing by conventional fasteners (not shown). The seal assembly 111 cooperates to create a seal between a high pressure region or space 118 and a low or atmospheric pressure space 119, the latter being the surrounding environment in the illustrated embodiment.

Seal assembly 111 includes opposed seal rings 121 and 122 which have generally flat annular seal faces 123 and 124 respectively formed thereon, the latter being disposed in closely adjacent and opposed relationship. The seal faces 123 and 124 are disposed generally within radially extending planes, and one of these seal faces has a pattern of grooves 125 formed therein, which grooves communicate with the radially outer edge of the annular contact zone between the seal faces so as to communicate with the high pressure space 118. These grooves 125, however, do not project radially through the entire contact zone between the seal faces 123 and 124, but rather terminate in spaced relation from the inner radial edge of the seal zone so as to define an annular dam region which provides greater restriction of flow, and restriction of leakage, of fluid therepast into the low pressure space 119. The grooves 125 are effective for permitting the fluid, normally a gas, to be moved into and hence create a small gap between the opposed seal faces 123 and 124 to thus minimize direct contact between these seal faces to significantly minimize seal face wear and overall frictional drag. The overall purpose of these grooves 125 is well known, and the grooves may adopt many different configurations and patterns, one example of which is illustrated by U.S. Pat. No. 4,212,475. A preferred pattern and arrangement for the grooves is disclosed in my copending U.S. application Ser. No. 08/115 153. The mechanical seal 111 of this invention, in a preferred embodiment, functions as a dry gas seal.

The seal ring 121 is mounted on and rotatably coupled to a shaft support sleeve 131, the latter being non-rotatably coupled to the shaft 113, so that the seal ring 121 rotates synchronously therewith. The shaft support sleeve 131 includes a radially projecting backing flange 132 which projects radially outwardly adjacent the backside of the seal ring 121, which backing flange 132 connects at its radially outer edge to an annular retaining flange 133 which projects axially so as to exteriorly surround at least a portion of the exterior peripheral surface of the seal ring 121. The backing flange 132 and the cooperating annular retaining flange 133 define a generally cup-shaped arrangement for support and confinement of the seal ring 121. An annular elastomeric O-ring 134 is confined within a groove formed in the backing flange 132 and resiliently and sealingly cooperates with the back face 135 of the seal ring 121. The seal ring 121 is also non-rotatably coupled to the shaft support sleeve 131, preferably by a resilient pinless drive connection 181 as explained in my copending application Ser. No. 08/286 665.

The rotating seal ring 121 is preferably constructed of a hard and non-yielding material, typically a carbide material such as silicon carbide or tungsten carbide.

With respect to the other seal ring 122, it is mounted on a housing ring 141 which is disposed within the chamber 115 and is fixedly captivated between the housing 112 and the gland 116. This housing ring 141 includes therein an annular axially-extending recess 142 defined by an inner annular wall 143. This recess receives therein at least the axially rearward part of the seal ring 122, the latter having an inner annular surface 144 which is disposed for axial slidable support on the inner annular wall 143. A spring retainer ring or disc 145 is positioned within the recess 142 directly adjacent the rear face of the seal ring 122 and is also axially movable along the inner annular wall 143. A plurality of springs, one of which is shown at 146, are disposed in circumferentially-spaced relationship, and axially cooperate between the housing ring 141 and the retainer ring 145 for urging the latter toward the rear face of the seal ring 122, which seal ring 122 is in turn resiliently urged axially toward the seal ring 121.

The housing ring 141 includes an annular flange 151 which projects axially inwardly therefrom in exterior surrounding relationship to the seal ring 122. This flange 151 has one or more keys or pins 152 non-rotatably secured thereto, which key 152 in turn is engaged within an axial groove formed in an annular flange part 153 which is integrally formed on and projects radially outwardly in surrounding relationship to the seal ring 122. This key 152 non-rotatably secures the seal ring 122 to the housing ring 141, but at the same time allows the seal ring 122 to slide axially along the key 152 in response to the resilient bias created by the spring 146.

The secondary seal arrangement 140 which cooperates with the axially movable seal ring 122 will now be described in greater detail.

The retainer ring 145 has an annular recess 147 therein in which the secondary seal arrangement 140 is confined. This arrangement 140 includes an annular elastomeric seal ring (i.e. a secondary seal) 148, such as an O-ring, which is disposed to create a resilient elastomeric sealing contact with both the rear face 161 (FIG. 13) of the seal ring 122 and the annular wall 143, as well as an elongate and substantially endless coiled tension spring 149 (often referred to as a garter spring) which is disposed in the recess 147 in surrounding and contacting relationship with the seal ring 148 so as to resiliently maintain the seal ring 148 in contact with the annular wall 143.

The recess 147 in the disc 145 is normally shallower (i.e. the axial depth) than the thickness of the O-ring 148, so that normally there is a slight separation between the front side 163 of the disc 145 facing the sealing ring 122 and the back side 161 of the sealing ring, and pressure of coil springs 146 transfers to the sealing ring 122 entirely through the O-ring 148 due to axial contact thereof between the opposed faces 161 and 162. Pressure by coil springs 146 is then responsible for contact by O-ring 148 with the rear face 161 of seal ring 122 and would be doing it even if tension spring 149 was absent.

The force and dimensional relationships of the secondary seal 140, and the cooperation thereof between the relevant contact surfaces 143, 161 and 162, will now be explained in greater detail with reference to FIG. 13.

The elastomeric O-ring 148 is disposed for direct contact with and between the opposed faces 161 and 162, with the O-ring 148 being maintained in sealing contact with each of these faces due to transmission therethrough of the biasing force imposed by the springs 146 on the disc 145. This total spring force, designated F1 in FIG. 13, is transmitted solely through the O-ring 148 unto the sealing ring 122 so as to urge this latter sealing ring toward the opposed sealing ring 121. Since the total of the spring force F1 is distributed, at least on an average, fairly uniformly along the length of the O-ring 148 (which length is generally equal to the circumferential length measured generally along the centerline of the O-ring), this hence results in a force F2 being applied to one side of the O-ring 148 per unit length thereof by the disc 145, this force F2 hence being equal to the spring force F1 divided by the length of the O-ring 148 as defined above. Similarly, under a static condition, an equal but opposite reactive force F3 is applied at the seal area between the opposite side of the O-ring 148 and the face 161, this force F3 per unit length of the O-ring being equal to the force F2.

To maintain a proper sealing contact between the O-ring 148 and the cylindrical housing surface 143, this invention provides the surrounding tension spring 149 which radially urges or biases the O-ring 148 inwardly so as to maintain an annular band of sealing contact with the surface 143. This spring 149 hence results in imposition of a generally radially directed force F4 against the outer periphery of the O-ring 148 per unit length thereof, and a similar opposed reactive force of substantially equal magnitude F5 exists where the O-ring contacts the housing surface 143. This reactive force F5, which is normal to the surface 143, in turn controls the frictional force F6 which extends axially along the surface 143 and determines the ease with which the O-ring 148 and the sealing ring 122 can be axially slidably urged relative to the other sealing ring 121.

Since the biasing springs 146 always exert an axially-directed force on the O-ring 148 so as to affect limited compression of the O-ring 148, the axial spacing or distance D between the opposed faces 161 and 162 will normally be maintained at a magnitude which is just slightly smaller than the non-deformed diameter $D_s$ of the O-ring 148. Further, the coils of the spring 149 will be provided with a diameter $D_c$ which will normally preferably be only slightly smaller than the distance D sufficient to prevent the spring 149 from restricting movement of the faces 161 and 162 toward one another, but at the same time this coil spring diameter $D_c$ will be only slightly smaller than the non-deformed diameter $D_s$ of the O-ring 148. This hence insures that the coil spring 149 will always be maintained in supportive and externally contacting engagement with the O-ring 148 substantially around the maximum outer diameter thereof, thereby resulting in the radially inwardly directed spring biasing force $F_4$ always being substantially radially inwardly directed so as to pass substantially through the geometric center of the O-ring, and thus providing a uniform and controlled sealing contact force $F_5$ at the housing surface 143. Further, this biasing force $F_4$, by being maintained substantially radially directed through the center of the O-ring, hence does not exert any significant or appreciable influence on the axially directed sealing forces $F_2$ and $F_3$ so as to effect or change the desired axial movement characteristic of the sealing ring 122.

To provide this desired performance characteristic, the diameter $D_c$ of the coil spring 149 is normally in the range of about 0.75 to about 0.85 of the non-deformed O-ring diameter $D_s$, and this coil spring diameter $D_c$ will typically be at least about 0.9 times the typical spacing D between the opposed seal-contacting faces 161 and 162 when the O-ring 148 is compressively loaded by the biasing springs 146. These relationships and the close axial confinement of the coil spring 149 between the opposed faces 161 and 162 thus insures that the spring urging force $F_4$ as applied to the O-ring is substantially radially directed so as to not influence or significantly affect the axially directed compressive forces, and at the same time maintain a highly uniform and controllable normal force $F_5$, which in turn maintains a uniform and controllable friction force $F_6$.

In the preferred embodiment, the elastomeric O-ring 148 is preferably of a stiff elastomeric material having a hardness of at least 70 durometer, and preferably a hardness of at least about 80 durometer.

Further, the springs 146 and 149 are preferably selected so that the unit length axial biasing force $F_2$ is significantly greater than the unit length biasing force $F_4$ created by the garter spring 149. In fact, the unit length force $F_2$ is preferably in the range of from about eight to about twelve times the magnitude of the unit length force $F_4$.

Figure 13:
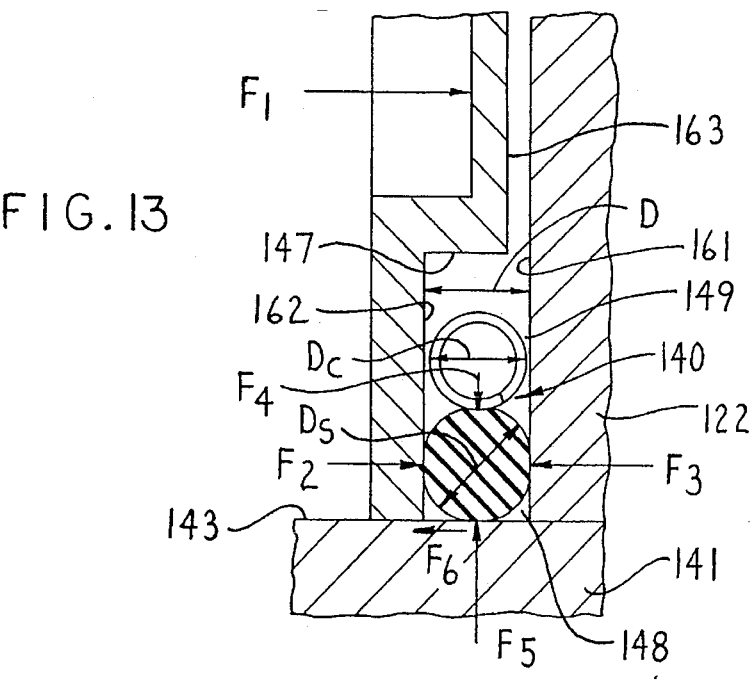
FIG. 13 is an enlarged fragmentary cross sectional view of the secondary seal of FIG. 12 for diagrammatically illustrating the force relationships associated with such secondary seal.

This overall secondary seal arrangement as illustrated by FIG. 13, and the fact that the O-ring 148 is radially unconfined within the recess 147 except for the presence of the surrounding tension spring 149, hence not only greatly facilitates the development of significantly different seal contact pressures at the radial face 143 relative to the axial faces 161 and 162, but also the coil spring 149 and its inherent ability to radially inwardly contract to varying degrees as it extends circumferentially around the O-ring 148 greatly facilitates the adaptation of the coil spring 149 to the varying thicknesses of the O-ring 148 throughout the length thereof, similar to the variations illustrated in FIGS. 4 and 8, so as to compensate for non-uniformities in the O-ring while still resulting in a substantially uniform contact force or pressure $F_5$ between the O-ring and the housing surface 143 throughout the annular contact area.

It should be noted that the inner diameter of the O-ring 148 in the normal non-stretched or non-loaded condition will typically be approximately equal to, or possibly only slightly greater or slightly smaller than, the diameter of the cylindrical housing surface 143 since it is desirable to avoid circumferential stretching of this O-ring 148 when mounting thereof on the surface 143. The contact pressure of force $F_5$ is thus generated primarily by the surrounding garter spring 149. The garter spring 149 when in the relaxed or non-stretched condition accordingly has an inner diameter which is significantly smaller than the outer diameter of the O-ring 148 so that the garter spring hence has to be circumferentially stretched (tensioned) to extend externally around the O-ring and thus imposes the radially directed force $F_4$ against the cross-section of the O-ring.

With the improved secondary seal as described above and particularly as shown by FIG. 13, the fact that the O-ring is not confined within a close-fitting recess (as shown in FIG. 2) also enables the seal to compensate for swelling of the O-ring without significantly effecting the O-ring contact force $F_5$ and its ability to axially slide. This also enables the O-ring to rather freely slide axially of the housing surface even though deposits may build up on this surface since the O-ring has the capability of deforming and passing over the deposits without significantly effecting the contact force $F_5$.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A device for sealing a fluid at a space between a housing and a rotatable shaft, comprising:

a first seal ring mounted on said shaft for rotation therewith and having a planar front sealing surface;

a second seal ring being axially movable and substantially coaxial with said first seal ring;

said second seal ring having a back surface and a planar front sealing surface defining a clearance with said first seal ring planar front sealing surface;

a cylindrical surface of said housing engaging coaxially said second seal ring;

an elastic means cooperating with said housing for axially biasing said second seal ring towards said first seal ring to close said clearance;

a disc positioned between said elastic means and said back surface, said disc having a facing surface thereon which is disposed in generally parallel axially opposed and axially spaced relation to said back surface;

a secondary seal positioned axially between said facing surface and said back surface and normally maintaining said disc and said second seal ring in axially spaced relation, said secondary seal being a single elastomeric O-ring disposed in surrounding relationship to said cylindrical surface, said O-ring having opposite axial sides thereof respectively maintained in direct sealing contact with said facing and back surfaces due to said elastic means; and a compliant endless annular spring externally surrounding and engaging only a radially oriented part of said O-ring and biasing said O-ring against said cylindrical surface for creating a direct sealing contact therebetween, said compliant spring being disposed axially between said facing and back surfaces and being free of radial engagement or restraint except for radial engagement thereof with said O-ring, said compliant spring having an axial width which is slightly smaller than the axial spacing between said facing and back surfaces when said O-ring is axially compressed therebetween so that said compliant spring exerts substantially solely a radially directed biasing force against said O-ring when said O-ring is elastomerically axially engaged between said facing and back surfaces due to said elastic means.

2. A device according to claim 1, wherein said compliant spring comprises an endless stretchable coil spring.

3. A device according to claim 2, wherein the coil spring has coils with a maximum diameter which is about 0.8 times the cross-sectional diameter of the O-ring in a non-deformed condition.

4. A device according to claim 3, wherein the maximum diameter of the coils of the coil spring is at least about 0.9 times the axial spacing between said facing and back surfaces when said O-ring is axially compressed between said facing and back surfaces.

5. A device according to claim 2, wherein said elastic means imposes an axial force on said O-ring per unit length which is from about eight to about twelve times greater than the force imposed on said O-ring per unit length by said compliant spring.

6. A device according to claim 2, wherein the compliant spring axially abuts only one of said facing and back surfaces at a time.

7. A device according to claim 2, wherein said facing and back surfaces respectively have coplanar annular surface portions which project radially outwardly in generally parallel and axially opposed relation and closely axially confine said compliant spring therebetween so that said compliant spring can engage only a radially outermost part of said O-ring.

* * * * *